Patented July 8, 1952

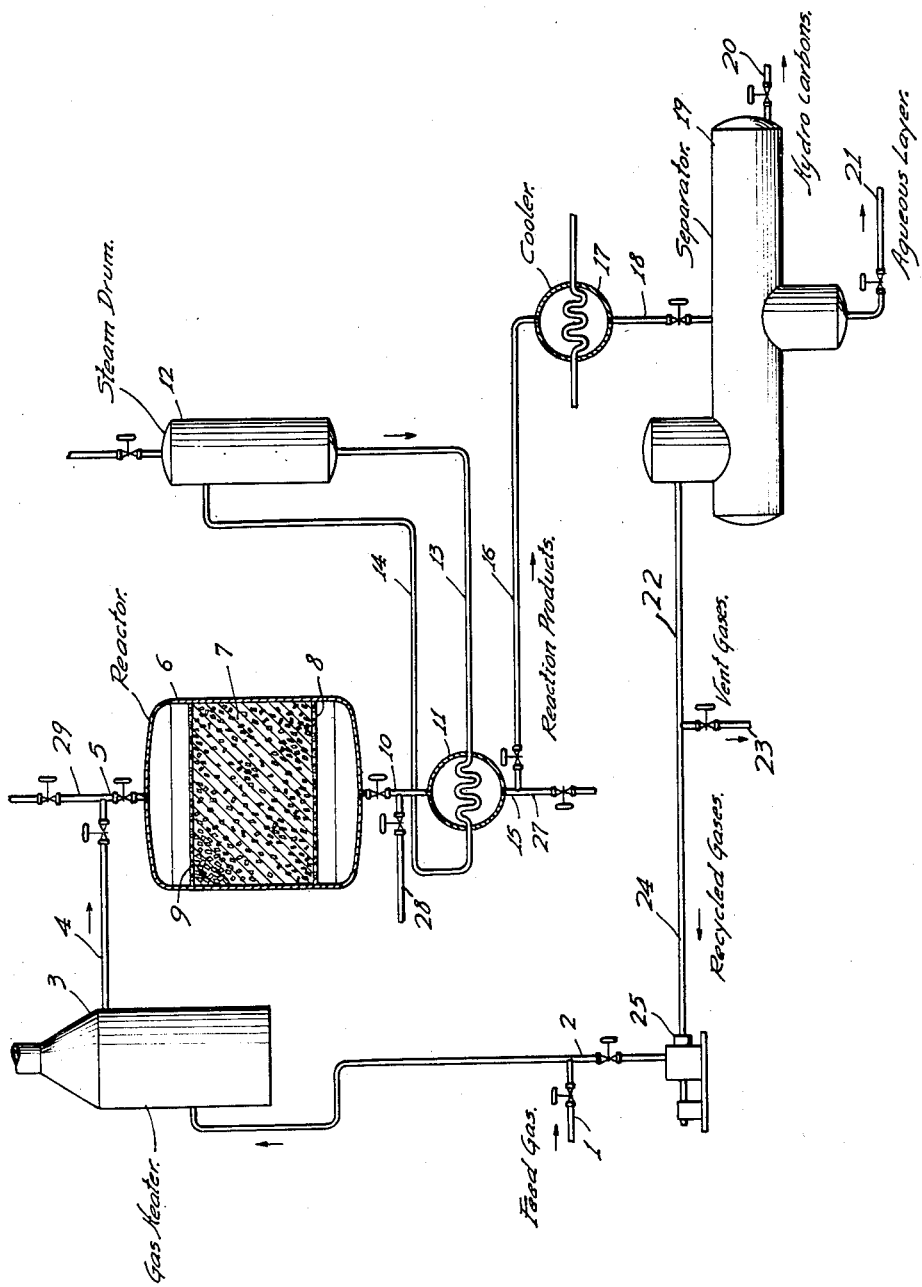

2,602,810

UNITED STATES PATENT OFFICE 2,602,810

PROCESS OF SYNTHESIZING HYDROCARBONS

Charles W. Montgomery and William A. Horne, Oakmont, Pa., assignors to Gulf Research & Development Company, Pittsburgh, Pa., a corporation of Delaware Application June 2, 1949, Serial No. 96,659

11 Claims. (Cl. 260—449.6)

This invention relates to the production of hydrocarbons by the reaction between hydrogen and carbon monoxide. More particularly, the invention relates to a process for the production of hydrocarbons from hydrogen and carbon monoxide utilizing a fixed catalyst bed.

In the production of hydrocarbons, e. g., hydrocarbons containing three or more carbon atoms, such as hydrocarbons boiling within the gasoline and gas oil boiling ranges, and wax hydrocarbons, by means of the reaction between hydrogen and carbon monoxide the problems presented arise because of the highly exothermic nature of the reaction and because of the necessity of maintaining long catalyst life if economical operation is to be obtained. As a solution to the problem of temperature control, a reactor has been employed comprising a plurality of catalyst tubes of relatively small cross-sectional area and a surrounding chamber containing a liquid cooling medium. This is not an entirely satisfactory solution to the problem because of the high initial cost of the equipment and the high maintenance costs which are especially serious when catalyst change becomes necessary. It has also been proposed to carry out the reaction on the adiabatic principle using a fixed bed of catalyst and recycling a portion of the product gases. The proposals along this line that have been made, however, have suggested the recycling of an uneconomical amount of gas or the use of a gas of such composition as to cause serious reduction of the effective life of the catalyst.

It is important in such a process that the catalyst remain effective for long periods before regeneration is necessary and that it be capable of being used in a plurality of on-stream periods. Operations which tend to reduce catalyst life are undesirable not only because of the catalyst and change-over costs, but also because when using an adiabatic system the time required to place the system on stream initially and after each regeneration may occupy on the order of 2 to 5 per cent of the operating time of the system, depending upon the effectiveness of the process employed. We have found that an important factor affecting catalyst life is the composition of the mixture charged to the reactor.

We have discovered in accordance with the invention that long catalyst life can be obtained while producing good yields of the desired hydrocarbons in relatively simple equipment by carrying out the reaction between hydrogen and carbon monoxide as described below. The process of the invention is carried out on the adiabatic principle so that control of the temperature of the catalyst is effected by the composition and quantity of gases contacted with the catalyst. The preferred embodiment comprises passing into contact with an iron synthesis catalyst maintained in a fixed bed at a hydrocarbon synthesis temperature and at a superatmospheric pressure a gas mixture consisting of a combination of about 1 part by volume of a feed gas consisting essentially of hydrogen and carbon monoxide in a mol ratio of at least 2.5:1, preferably at least 2.8:1; for example between about 2.8:1 and 4:1, and especially between about 2.9:1 to 3.2:1, and about 8 to about 15 parts by volume of gas recycled from the products of the reaction. The process is carried out so that the combination of the feed gas and the recycled gas contains hydrogen and carbon monoxide in a mol ratio of at least 15:1 and preferably between about 15:1 and 30:1. The hot products of reaction are then cooled to condense at least the normally liquid hydrocarbons and other compounds boiling above such hydrocarbons. Preferably, the condensation is carried out so as to condense most of the $C_4$ and heavier hydrocarbons and oxygenated compounds formed in the reaction. The remainder of the reaction products in gas phase under these conditions is separated into a portion for recycling and a portion which is removed from the system. The recycled portion is then admixed with fresh feed gas, preferably heated to about the temperature required for initiation of the desired reaction, and passed into contact with the catalyst.

The process of the invention should be carried out so as to obtain high conversions of carbon monoxide, preferably at least 98 per cent, and ordinarily a run should be stopped when the conversion has fallen to below 95 per cent. High conversions are important because any carbon monoxide that is not converted to useful products in a process of this type cannot be recovered effectively. With given temperature and pressure conditions and catalyst activity, the conversion of carbon monoxide is determined principally by the reactor feed composition and the space velocity maintained. The control of temperature in the present process is accomplished by controlling the temperature and composition of the reactor feed. We have discovered that when operating as described involving the use of high hydrogen to carbon monoxide ratios and high conversions of carbon monoxide in the presence of an iron catalyst, there can be maintained a substantial temperature gradient across the catalyst bed; for example, a temperature gradient of about 100° to 200° F., and preferably a temperature gradient of about 125° to 165° F. We have found that under these conditions the yield of the desired products is high and the process is made commercially attractive because extended runs can be carried out and low ratios of recycled gas to fresh feed can be employed. The use of high ratios of hydrogen to carbon monoxide in the fresh feed and in the reactor feed, however, is essential since the temperature at the exit of the catalyst bed is necessarily high, which we have found to cause, when the reactor feed contains a high proportion of carbon monoxide, early destruction of desired physical properties of the catalyst. In general, it is preferred to operate so that the temperature of the reactor feed is at, or not substantially above, the reaction initiation temperature and the temperature at the exit end of the catalyst bed is between about 610° to about 630° F. Depending on the iron catalyst employed and its activity, the minimum reactor feed temperature should lie within the range of about 430° F. to about 525° F.

By operating as described, the catalyst can remain on stream for an extended time and it may be subjected to a plurality of regeneration and on-stream periods. The process is characterized by effective utilization of carbon monoxide, which as stated above, is substantially entirely converted to useful products in the synthesis reaction. The gas which must be removed from the process contains an amount of hydrogen making this gas available for employment in hydrogenation reactions. Moreover, by operating in this way a more or less balanced yield of gasoline hydrocarbons, gas-oil hydrocarbons and wax hydrocarbons can be obtained.

A typical method of carrying out the preferred embodiment will be described in connection with the accompanying drawing in which the single figure is a simplified flow sheet of a suitable plant system. Referring to the drawing, the fresh feed, comprising in this case hydrogen and carbon monoxide in a mol ratio between about 2.9:1 and about 3.2:1, is fed into the system under pressure at a controlled rate through a valved line 1 which leads to a line 2 in which is flowing recycled gases as will later be described. The recycled gases will comprise, in addition to butane, propane, ethane, methane, and the corresponding unsaturated hydrocarbons; oxygenated organic compounds; carbon monoxide; hydrogen; carbon dioxide; and normally a small amount of nitrogen. These gases will be saturated with water vapor and the proportions in which the several compounds are present in the recycled gases will depend upon the specific conditions employed in separating the gases for recycling from the product gases. Also, because the separation is not clean-cut there will be traces of heavier hydrocarbons. The mixture of feed gas and the recycled gases passes through a gas heater 3 wherein the temperature of the gases is preferably raised to the temperature maintained at the top of the catalyst bed, for example, a temperature between about 430° and 500° F. The gases at this temperature are passed from the gas heater through line 4 and line 5 leading to a fixed-bed reactor 6. The reactor 6 is of simple design and comprises a cylindrical vessel in which is disposed a solid bed of catalyst 7. The catalyst is supported on a suitable foraminous support 8 and may, if desired, be confined at its upper surface by a similar foraminous member 9. The heated gases are introduced at a selected rate such as to obtain a desired space velocity, for example, a space velocity (volume of feed gas at standard conditions per volume of catalyst per hour) of 300 or greater. The temperature at the top of the catalyst bed is maintained at about the temperature of the entering gases. On passing through the catalyst bed, the desired synthesis reaction takes place resulting in the evolution of considerable heat. Because of the volume of gases in the charge mixture that do not take part in the reaction, running away of the temperature of the catalyst bed is prevented. However, under the conditions described there is an increase of temperature from top to bottom of the bed of about 125° to about 175° F., provided however that the maximum temperature reached does not exceed about 630° F. Thus the temperature at the bottom of the bed may lie within the range of about 600° to 630° F.

The product gases are removed from the bottom of the reactor through a line 10 and are passed through a heat exchanger 11. This heat exchanger is preferably employed for the production of steam and for this purpose is shown connected with a steam drum 12 by means of lines 13 and 14. The reaction products, somewhat reduced in temperature, are then passed through lines 15 and 16 and are then cooled additionally in a cooler 17 in which their temperature is reduced to at least 120° F., for example to a temperature between about 40° and about 120° F., the specific temperature being sufficiently low to cause condensation of the desired products. The cooled products are then passed through line 18 leading to a separator 19 of conventional design. In this separator an aqueous layer and a liquid hydrocarbon layer are formed. The hydrocarbons that are liquid under these conditions are removed from the system through a line 20 and the aqueous layer comprising a solution of oxygenated compounds, such as alcohols and ketones, is removed through line 21. The remaining gaseous products are passed from the separator through line 22 and a portion of them is vented from the system through line 23. The vent gas may be processed to separate the hydrocarbons and hydrogen. The portion vented is regulated to hold system pressure, in this case 150 pounds per square inch and acts as a bleed to prevent inert gas build-up in the system. When a run is in progress, the amount of vent gas plus liquid products will be equal in weight to the feed gas. The remaining gases are passed through line 24 and are raised to a pressure somewhat in excess of the desired reaction pressure by means of blower 25 so that the volume of gases recycled to the reactor is about 8 to 15 times the volume of the fresh feed, and then flow into line 2 as previously described.

In many cases the catalyst is subjected to partial or complete reduction prior to being contacted with the reactor feed. This may be accomplished in the system shown by introducing hydrogen through line 1, raising the temperature of the hydrogen in heater 3 to a temperature, for example, of the order of 600° to 950° F. and then passing the heated gas through the reactor. The gases produced in this reducing procedure may be removed from the system through line 10 and line 27, the valve in line 16, of course, being closed. Regeneration of the catalyst by oxidation with an oxygen-containing gas such as air can be accomplished in the system shown by introducing air through line 28 and passing the air through line 10 into the reactor 6. The products of combustion are passed through line 5 and are removed from the system through valved line 29. In this case, of course, the valves in lines 4, 16 and 27 are closed.

The iron synthesis catalysts employed in the present process may be in the completely oxidized, partially oxidized, or completely reduced state and may, if desired, be employed in conjunction with suitable promoters such as alumina and potassium oxide and may be disposed on suitable supports such as fuller's earth, activated alumina, acid-treated montmorillonite clays and the like. The research work carried out in connection with this invention, however, has indicated that iron catalysts prepared by precipitation of iron oxide are particularly valuable, especially when employed in the unpromoted state. We have also found that the extent of reduction of these catalysts has an important effect upon their value in the process. Thus, superior results are obtained when the catalyst has been from 10 to 100 per cent reduced from the oxide and preferably from 50 to 100 per cent reduced from the oxide. The effect of the extent of the reduction of the catalyst is felt most strongly during the period when the unit is being placed on stream although this extent of reduction also has an important effect on the character of the products obtained. In this connection, it will be understood that the catalyst will usually be reduced in the synthesis unit and therefore in speaking of extent of reduction, the extent of reduction of the mass of catalyst in the unit as determined as hereinafter described or by similar methods, is intended.

As previously indicated, if the maximum temperature is controlled, excellent results are obtained in the present process by maintaining a substantial temperature gradient across the catalyst bed. When maintaining the mol ratio of hydrogen to carbon monoxide in the fresh feed within the ranges previously described and utilizing a partially reduced iron oxide catalyst, the temperature of the charge mixture may be of the order of 430° to 450° F. At this temperature the desired reaction is initiated and with ratios of recycled gases to fresh feed of about 8:1 to about 15:1, the maximum temperature in the catalyst bed, which is reached at the exit of the bed, is about 600° F. to about 630° F. On the other hand, when using an oxide catalyst, it is necessary that the mixture be heated to a temperature of the order of 500° F. in order to initiate reaction. In this case the recycle ratio must be increased within the limits mentioned above in order not to exceed a maximum temperature of about 630° F. It will be understood that the effect of an excessive temperature in the catalyst bed is to promote the formation and deposition on the catalyst of relatively large amounts of carbon which cause the rapid destruction of the physical state of the catalyst, requiring an early shutdown of the unit.

There will now be described a number of runs further illustrating the present invention. The catalysts employed in these runs were modifications of the same base catalyst. The base catalyst was prepared as a precipitated iron oxide which analysis indicated to be $Fe_2O_3$ with only traces of other metals. The catalyst had been formed in a compression pelleting machine into cylindrical pellets about ⅛ inch in diameter and about ⅛ inch in height. In each case 1400 cc. of this catalyst weighing about 2734 grams were charged to a reactor about 3 inches in diameter forming a fixed catalyst bed about 11 inches in height. The reactor was part of a system such as disclosed in the drawing. The reactor was designed for adiabatic operation since it consisted simply of the reactor shell, the bottom foraminous catalyst support, and means for preventing heat loss from the catalyst bed to the atmosphere.

The catalyst was then dried, for example, by passing a gas over the catalyst at a temperature of about 250° F. to 300° F. for about 3 hours. Hydrogen was used as the drying gas for convenience; however, an inert gas is suitable but requires flushing from the system after drying. At this stage the catalyst was ready for use when it was to be used as the oxide. When completely or partially reduced catalysts were to be prepared, heated hydrogen gas was then flowed over the catalyst at one atmosphere pressure at a space velocity of about 1150. When the catalyst bed had been heated to a temperature of about 510° F., reduction of the catalyst began to occur. The passage of the heated hydrogen in contact with the catalyst was continued until the desired degree of reduction had been attained; the catalyst reaching a temperature in the neighborhood of 650° F. early in the reduction period. For example, to prepare a catalyst about 50 per cent reduced from the oxide, the passage of hydrogen was continued for about twenty-four hours. 490.9 grams of water were formed in the reduction procedure. Since complete reduction of the catalyst would have formed 922.7 grams of water, the catalyst was 53.2 per cent reduced from the oxide.

The procedure just described was followed not only when preparing a catalyst initially but also when readying a catalyst for use after being regenerated.

To place the reactor on stream it was brought up to a pressure of about 150 pounds per square inch with hydrogen, and at this pressure recycling was started at about 285 cubic feet per hour (at standard conditions of 32° F. and one atmosphere pressure). The catalyst bed temperature was brought up to about the temperature required for initiation of the reaction, the specific temperatures being given in the following Table I. At that time the flow of a fresh feed synthesis gas composed substantially entirely of hydrogen and carbon monoxide in a mol ratio of hydrogen to carbon monoxide of about 3.2:1 into the reactor was begun at a rate of about 18.5 cubic feet per hour (at standard conditions of 32° F. and one atmosphere pressure) in combination with hydrogen in an amount sufficient to make the total flow about 360 cubic feet per hour. The rate of flow of fresh feed was increased in stages while decreasing the amount of hydrogen until it reached a value of about 32.5 cubic feet per hour. This is a space velocity (volumes of gas at standard conditions per volume of catalyst per hour) of about 657. The time required to reach this value depended upon the specific catalyst used. During this start-up or lining-out period, the gases are separated as described below and adjusted in volume in relation to the fresh feed and hydrogen to obtain the desired maximum temperature and temperature gradient across the catalyst bed.

At the end of this lining-out period, the fresh feed in admixture with recycled gases was being introduced at the reaction initiation temperature and the maximum temperature in the catalyst bed which existed at about the bottom of the bed was in each case as shown in Table I. The reaction products produced were cooled to about 40° F. while maintaining the pressure in the neighborhood of 150 pounds per square inch, and were passed into a separator wherein a separation of the liquid and gaseous materials was accomplished. The gaseous products were separated into a portion which was vented from the system and a portion equal in volume at standard conditions to the multiple of the volume of the fresh feed indicated by the recycle ratio shown in the table. The inlet temperature was increased slightly as a run progressed in order to counteract the decrease in carbon monoxide conversion caused by reduction of catalyst activity. The run was continued so long as the conditions of operation described previously were maintained. The most striking indication of unsatisfactory operation is the drop in the mol ratio of hydrogen to carbon monoxide in the reactor feed to below 15:1, caused by reduction in catalyst activity. The on-stream period was then discontinued.

The catalyst was then regenerated by a procedure comprising flushing the system with an inert gas and then bleeding into the reactor a small stream of air (about 3.5 cubic feet per hour) and a stream of nitrogen (about 9.9 cubic feet per hour). The products of the regeneration were recycled to the catalyst bed at a rate of about 80 to 85 cubic feet per hour. The peak catalyst bed temperature was about 450° F. under these conditions. The air rate was then gradually increased to about 23 cubic feet per hour and the nitrogen feed cut to zero. The peak temperature of the catalyst was gradually increased to about 950° F. where it was maintained throughout most of the regeneration period which usually occupied a total time of about 36 hours. The regenerated catalyst after successive on-stream periods was in substantially the same condition as the fresh base catalyst introduced into the reactor.

The cycle of operations in the present process comprises the periods described; a period for drying and reduction of the catalyst, if a completely or partially reduced catalyst is used; a lining-out period; a reaction period; and a regeneration period. The lining-out period and the reaction period, during both of which hydrocarbons are produced, are together referred to as the on-stream period.

In order to compare results obtained when operating in accordance with the invention and when operating outside the invention, data with respect to two periods of operation on each of two catalysts are given in the following table as well as data with respect to single periods of operation on each of three other catalysts. Two of these three catalysts were not used under conditions outside the scope of this invention, while the third was not used under the conditions of the present invention. Of the catalysts identified in the table, catalyst A was 53.2 per cent reduced from the oxide, catalyst B was 71.5 per cent reduced, catalyst C was 90.8 per cent reduced, catalyst D was 10.9 per cent reduced, and catalyst E was an unreduced oxide.

Table I

| Catalyst | A | | B | | C | D | E |
|---|---|---|---|---|---|---|---|
| | Period I | Period II | Period I | Period II | | | |
| Space Velocity—Fresh Feed | 657 | 657 | 657 | 657 | 657 | 657 | 657 |
| Mol Ratio $H_2/CO$ in Fresh Feed | 3.29 | 3.19 | 3.26 | 3.26 | 3.19 | 3.26 | 3.27 |
| Recycle Ratio (Vol. of Recycled Gas/Vol. of Fresh Feed) | 9.0 | 9.1 | 9.1 | 9.1 | 9.1 | 9.1 | 24.9 |
| Space Velocity-Reactor Feed | 6,550 | 6,640 | 6,600 | 6,600 | 6,636 | 6,661 | 16,850 |
| Mol Ratio $H_2/CO$ in Reactor Feed | 24.5 | 8.3 | 22.9 | 11.4 | 18.7 | 19.6 | 18.4 |
| CO Conversion (percent) | 99.5 | 85.1 | 99.7 | 96.6 | 98.5 | 99.3 | 98.5 |
| Liquid Yield ($C_{3+}$ Per 1000 Cubic Feet Fresh Feed) in pounds | 5.4 | 3.5 | 5.13 | 3.53 | 5.62 | 5.2 | 3.3 |
| $C_{3+}$ Efficiency (percent converted CO converted to $C_{3+}$ Hydrocarbons) | 75.4 | 65.5 | 70.6 | 58.6 | 76.5 | 69.2 | 45.4 |
| $C_{5+}$ Efficiency (percent converted CO converted to $C_{5+}$ Hydrocarbons) | 53.5 | 46.9 | 45.2 | 37.5 | 52.7 | 44.8 | 24.5 |
| Gasoline ($C_5$—400° F.) Octane No. (ASTM Res.) Clear | 54 | 48 | 56.6 | 38.7 | 58.1 | 46.1 | 47.4 |
| +3 cc. Tel./Gal | 76.8 | 66.9 | 78.4 | 72 | 73.1 | 73.4 | 65.4 |
| Inlet Temperature ° F | 439 | 452 | 455 | 466 | 447 | 459 | 551 |
| Maximum Catalyst Bed Temperature ° F | 599 | 615 | 599 | 606 | 606 | 609 | 609 |
| Temperature Gradient Across Catalyst Bed ° F | 160 | 163 | 144 | 140 | 159 | 150 | 58 |
| Relative Power Requirement to Recycle Gas (Recycle Ratio of 9.0=100) | 100 | 102.2 | 102.2 | 102.2 | 102.2 | 102.2 | 769 |

The results given in Table I provide striking evidence of the advantages of the process of the invention involving the use of high hydrogen to carbon monoxide ratios in the fresh feed, preferred recycle ratios of about 9 and maintaining the hydrogen to carbon monoxide ratio above 15:1. It is to be noted that these advantages reside not only in the improved liquid yields and proportion of the converted carbon monoxide appearing in the form of relatively heavy hydrocarbons, but also in the quality of the gasoline produced. This last advantage is unexpected in that in most processes where high yields are obtained it is usually the case that quality suffers.

If the results obtained using catalyst A in period I are compared with results obtained using this catalyst in period II, it will be seen that the conditions maintained in these two periods are substantially the same except that the hydrogen to carbon monoxide ratio in the reactor feed in period I was 24.5 whereas this ratio in period II was 8.3. Also the carbon monoxide conversion was 99.5 per cent in period I and 85.1 per cent in period II. These differences in operating conditions resulted in a marked decrease in liquid yield, the yield in period II being only about 65 per cent of the yield in period I. Moreover, the $C_{3+}$ and $C_{5+}$ efficiencies for period I are substantially better than those for period II and the quality of the gasoline is substantially better for period I. A similar comparison may be made between catalyst B, period I, and catalyst B, period II. In this case the only substantial difference in operating conditions is the hydrogen to carbon monoxide mol ratio in the reactor feed: 22.9 as compared with 11.4. Yet the liquid yield, $C_{3+}$ and $C_{5+}$ efficiencies, and the quality of the gasoline were all markedly better for period I than for period II. The run on catalyst E, which was carried out under conditions outside the scope of the present invention, are interesting in that the most important variation from the conditions of the invention resides in the recycle ratio, which is 24.9 rather than between about 8 and about 15. Here again the liquid yield, efficiencies and quality of gasoline were all relatively low. It is believed that to some extent the disadvantageous results obtained in this run are attributable to the fact that the catalyst was a completely oxidized catalyst. As previously indicated, the experimental work leading to the development of this invention has indicated that partially or completely reduced iron catalysts are superior for use in the present process to oxide catalysts and that catalysts which are 50 to 100 per cent reduced from the oxide are especially preferred. While this cannot be shown by means of numerical results, the run carried out in catalyst E had the additional disadvantage over those shown by the data in the table of being difficult to start up. The temperature was difficult to control and the lining-out period was longer than was necessary to compensate for decreased catalyst activity and if such an increase in temperature is not effective to raise the reactor feed hydrogen to carbon monoxide ratio above 15, then the on-stream period should be discontinued and the catalyst regenerated or replaced. With a fixed feed gas composition and recycle ratio, the composition of the reactor feed is dependent upon the composition of the recycled gases. Typical analyses of recycled gases (on dry basis) are given in the following Table II with respect to the run involving the use of catalyst A in period I and period II, as to which other data was supplied in Table I.

*Table II*

| Component (Vol. Percent) | CO | $H_2$ | $CO_2$ | $N_2$ | $CH_4$ | $C_2H_4$ | $C_2H_6$ | $C_3H_6$ | $C_3H_8$ | $C_4H_8$ | $C_4H_{10}$ | $C_5H_{10}$ | $C_5H_{12}$ | $C_{6+}$ |
|---|---|---|---|---|---|---|---|---|---|---|---|---|---|---|
| Catalyst A, Period I | 0.5 | 67.1 | 0.7 | 1.0 | 15.8 | 0.3 | 6.5 | 1.6 | 3.3 | 1.1 | 1.0 | 0.3 | 0.3 | 0.4 |
| Catalyst A, Period II | 7.7 | 70.0 | 4.8 | 1.1 | 10.8 | 0.3 | 2.2 | 0.5 | 1.0 | 0.5 | 0.4 | 0.2 | 0.2 | 0.3 |

It has been stated previously that the present process has the advantage that the catalyst can remain in use for an extended period of time. The data given in the following Table III is of interest on this point. A run was terminated when the pressure drop through the catalyst bed became excessive, indicating break-down of catalyst, or the run had been carried out a sufficiently long time to demonstrate that it could be continued indefinitely.

*Table III*

| Catalyst | Total Hours on Stream | Total Hours on Regeneration and Reduction | Pressure Drop Across Catalyst Bed after 500 Hours (p. s. i.) | Condition of Catalyst at End of Run |
|---|---|---|---|---|
| Catalyst A | 890 | 143 | 0.15 | Good. |
| Catalyst B | 1,370 | 285 | 0.0 | Good; slight amount of powdering. |
| Catalyst C | 1,865 | 315 | 0.0+ | Reduced state; some carbon, wax, powder. |
| Catalyst D | 1,221 | 100 | 0.0+ | Good; slight amount of powdering. |
| Catalyst E | 581 | [1] 24 | 0.5 | Fair condition; some carbon. |
| Catalyst F [3] | 357 | [1] 85 | [2] 9.1 | Poor condition; 3.4 inch plug at base of bed. |

[1] No reduction time.
[2] End of 357 hours.
[3] Catalyst F was an iron oxide catalyst similar to catalyst E. The run on Catalyst F was carried out using a fresh feed containing hydrogen to carbon monoxide in a mol ratio of 1.85:1, a recycle ratio of about 30, and a reactor feed containing hydrogen and carbon monoxide in a mol ratio of 1.52:1.

with the other catalysts. Also the run carried out using catalyst D, which was about 10 per cent reduced from the oxide, created more difficulties than the runs carried out using catalysts A, B, and C, which were from 50 to 100 per cent reduced from the oxide.

When operating in accordance with the invention, one condition that should be observed carefully is the ratio of hydrogen to carbon monoxide in the reactor feed. This ratio is indicative of the activity of the catalyst and carbon monoxide conversion and, of course, is dependent upon the composition of the fresh feed, the composition of the recycled gases and the recycle ratio. Accordingly, the control of the process can be effected by varying conditions in accordance with the changes in the mol ratio of hydrogen to carbon monoxide in the reactor feed. For example, when operating with a fixed fresh feed composition and recycle ratio and this mol ratio falls below 15, the inlet temperature should be raised The present process when carried out under optimum conditions is productive of hydrocarbons ranging from light gases through gasoline hydrocarbons to heavier liquid hydrocarbons and wax hydrocarbons. Typical of the product distribution among the compounds included in the liquid yield ($C_{3+}$ hydrocarbons) is that for period I of the run on catalyst A. In this case the distribution, in weight per cent of the product, was: gas, 4.8 per cent; gasoline ($C_5$'s to 400° F.), 69.9 per cent; 400°–700° F., 18.7 per cent; and above 700° F., 6.6 per cent.

It will be understood that the conditions disclosed with respect to the foregoing runs may be varied within the scope of the invention. While it is generally preferred to carry out the process at a pressure of about 150 pounds per square inch, other superatmospheric pressures may be used, such as pressures within the ranges of about 50 to about 650 pounds per square inch. Since the pressure does not appear to have a critical effect on the process, higher pressures can be used but are not preferred because their use requires specially designed equipment. Also, provided the other conditions of the process are maintained within the limits described above, the fresh feed space velocity may be varied, the only considerations being the practical ones of overcoming pressure drop through the catalyst bed when high space velocities are employed and of an economical throughput at lower space velocities.

We have stated that the reactor feed should be heated prior to being contacted with the catalyst at least to the reaction initiation temperature, which varies depending upon the specific catalyst employed and the activity of the catalyst. We have also stated that the process can be carried out so as to compensate for a decrease in activity of the catalyst by increasing the temperature during an on-stream period. While hydrocarbons can be produced under other temperature conditions, in general we prefer to maintain this reactor feed or inlet temperature when using a partially or completely reduced iron catalyst within the range of about 430° to about 475° F., the lower temperatures being employed when the catalyst is relatively fresh, either a new catalyst or regenerated catalyst, and the temperature being gradually increased towards the latter part of a run. When using an iron oxide catalyst we have found that ordinarily reaction is not initiated unless the reactor feed is heated at least to about 490° F., and better about 500° F. During a run this temperature is preferably increased but the maximum should not ordinarily exceed about 530° F.

The prior description has largely been concerned with a preferred embodiment of the invention involving condensing a part of the reaction products and recycling to the reactor a portion of the remainder. The invention in its broader aspects is not limited to this embodiment as insofar as what takes place in the reactor is concerned the source of the gases admixed with the fresh feed is unimportant and therefore gases which do not interfere with the reaction and which provide hydrogen and carbon monoxide to the total reactor feed in amounts sufficient to produce a total feed containing hydrogen and carbon monoxide in a mol ratio of at least 15:1 can be employed in quantities such that the added gases are present in amounts that produce a total feed in which the volume ratio of added gases to fresh feed is between about 8:1 to about 15:1. For example, many of the advantages of the invention are obtained by recycling gases of the composition of the reaction products. This can be done by omitting the condensation step, bleeding off to a recovery system a part of the reaction products and recycling the remainder.

Obviously many modifications and variations of the invention, as hereinbefore set forth, may be made without departing from the spirit and scope thereof, and therefore only such limitations should be imposed as are indicated in the appended claims.

We claim:

1. A process for the production of hydrocarbons by the reaction between hydrogen and carbon monoxide which comprises passing into contact with an iron synthesis catalyst at hydrocarbon synthesis temperature and superatmospheric pressure a reactor feed containing hydrogen and carbon monoxide in a mol ratio of at least 15:1 and comprising one part by volume of fresh feed consisting essentially of hydrogen and carbon monoxide in a mol ratio of about 2.5:1 to about 4:1 and about 8 to about 15 parts by volume of recycled gas, as defined below, separating from the resulting reaction product the bulk of the $C_4$ and heavier hydrocarbons and oxygenated compounds formed in the reaction, and recycling a portion of the remainder of the reaction product as recycled gas for combination with said fresh feed to form said reactor feed.

2. A process for the production of hydrocarbons by the reaction between hydrogen and carbon monoxide which comprises passing into contact with an iron synthesis catalyst at least partially reduced from the oxide a reactor feed containing hydrogen and carbon monoxide in a mol ratio of about 15:1 to about 30:1 and comprising one part by volume of fresh feed consisting essentially of hydrogen and carbon monoxide in a mol ratio of about 2.8:1 to about 4:1 and about 8 to about 15 parts by volume of recycled gas, under conditions including a hydrocarbon synthesis temperature and a superatmospheric pressure effective to convert at least 95 per cent of the carbon monoxide contacting said catalyst, separating from the resulting reaction product the bulk of the $C_4$ and heavier hydrocarbons and oxygenated compounds formed in the reaction, and recycling a portion of the remainder of the reaction product as recycled gas for combination with said fresh feed to form said reactor feed.

3. A process for the production of hydrocarbons by the reaction between hydrogen and carbon monoxide which comprises passing into contact with a fixed bed of an iron synthesis catalyst at least 50 to 100 per cent reduced from the oxide a reactor feed containing hydrogen and carbon monoxide in a mol ratio of about 15:1 to about 30:1 and comprising one part by volume of fresh feed consisting essentially of hydrogen and carbon monoxide in a mol ratio of about 2.8:1 to about 4:1 and about 8 to about 15 parts by volume of recycled gas under conditions including a hydrocarbon synthesis temperature and a superatmospheric pressure effective to convert at least 98 per cent of the carbon monoxide contacting said catalyst, separating from the resulting reaction product the bulk of the $C_4$ and heavier hydrocarbons and oxygenated compounds formed in the reaction, and recycling a portion of the remainder of the reaction product as a recycled gas for combination with said fresh feed to form said reactor feed.

4. A process for the production of hydrocarbons by the reaction between hydrogen and carbon monoxide which comprises passing into contact with a fixed bed of an iron synthesis catalyst at least partially reduced from the oxide a reactor feed at an elevated reaction initiation temperature, said reactor feed containing hydrogen and carbon monoxide in a mol ratio of about 15:1 to about 30:1 and comprising recycled gas and fresh feed in a volume ratio of about 8:1 to about 15:1, said fresh feed consisting essentially of hydrogen and carbon monoxide in a mol ratio of about 2.8:1 to about 4:1, under conditions effective to convert at least 98 per cent of the carbon monoxide contacting said catalyst, controlling the temperature of the catalyst bed by the temperature of the reactor feed and the volume ratio of recycled gas to fresh feed in the reactor feed, the temperature of the reactor feed and said volume ratio being adjusted so that the temperature gradient across the catalyst bed is between about 100° and about 200° F., separating from the resulting reaction product the bulk of the $C_4$ and heavier hydrocarbons and oxygenated compounds formed in the reaction, and recycling a portion of the remainder of the reaction product as recycled gas for combination with said fresh feed to form said reactor feed.

5. A process for the production of hydrocarbons by the reaction between hydrogen and carbon monoxide which comprises passing into contact with a fixed bed of an iron synthesis catalyst at least 50 to 100 per cent reduced from the oxide a reactor feed at an elevated reaction initiation temperature between about 430° and about 475° F., said reactor feed containing hydrogen and carbon monoxide in a mol ratio of about 15:1 to about 30:1 and comprising recycled gas and fresh feed in a volume ratio of about 8:1 to about 15:1, said fresh feed consisting essentially of hydrogen and carbon monoxide in a mol ratio of about 2.8:1, to about 4:1, under conditions effective to convert at least 98 per cent of the carbon monoxide contacting said catalyst, maintaining a temperature gradient across said catalyst bed between about 125° and about 165° F. and a maximum catalyst bed temperature of about 600° to about 630° F., separating from the resulting reaction product the bulk of the $C_4$ and heavier hydrocarbons and oxygenated compounds formed in the reaction, and recycling a portion of the remainder of the reaction product as recycled gas for combination with said fresh feed to form said reactor feed.

6. In a process for the production of hydrocarbons by the reaction between hydrogen and carbon monoxide, the improvement which comprises passing a combination of one part by volume of fresh feed consisting essentially of hydrogen and carbon monoxide in a mol ratio of about 2.8:1 to about 4:1 and about 8 to about 15 parts by volume of a fraction of products produced in the reaction into contact with an iron synthesis catalyst at a hydrocarbon synthesis temperature and superatmospheric pressure, said combination of said fresh feed and said fraction containing hydrogen and carbon monoxide in a mol ratio of about 15:1 to about 30:1.

7. A process in accordance with claim 6 in which said iron synthesis catalyst is at least partially reduced from the oxide.

8. A process in accordance with claim 6 in which said iron synthesis catalyst is 50 to 100 per cent reduced from the oxide.

9. A process for the production of hydrocarbons by the reaction between hydrogen and carbon monoxide which comprises passing into contact with a fixed bed of an iron synthesis catalyst at least partially reduced from the oxide a reactor feed at an elevated reaction initiation temperature, said reactor feed containing hydrogen and carbon monoxide in a mol ratio of about 15:1 to about 30:1 and comprising reaction vapors as described below and fresh feed in a volume ratio of about 8:1 to about 15:1, said fresh feed consisting essentially of hydrogen and carbon monoxide in a mol ratio of about 2.8:1 to about 4:1, under adiabatic conditions effective to convert at least 98 per cent of the carbon monoxide contacting said catalyst, controlling the temperature of the catalyst bed by the temperature of the reactor feed and the volume ratio of said reaction vapors to fresh feed in the reactor feed, the temperature of the reactor feed and said volume ratio being adjusted so that the temperature gradient across the catalyst bed is between about 100° and 200° F., cooling resulting reaction product to form a condensed fraction and reaction vapors, and recycling at least a portion of said reaction vapors for combination with said fresh feed to form said reactor feed.

10. A process for the production of hydrocarbons by the reaction between hydrogen and carbon monoxide which comprises passing into contact with a fixed bed of an iron synthesis catalyst at hydrocarbon synthesis temperature, superatmospheric pressure, and under adiabatic conditions, a reactor feed containing hydrogen and carbon monoxide in a mol ratio of about 15:1 to about 30:1 and comprising one part by volume of fresh feed consisting essentially of hydrogen and carbon monoxide in a mol ratio of about 2.5:1 to about 4:1 and about 8 to about 15 parts by volume of reaction vapors as described below, cooling resulting reaction product to form a condensed fraction and reaction vapors, and recycling at least a portion of said reaction vapors for combination with said fresh feed to form said reactor feed.

11. A process for the production of hydrocarbons by the reaction between hydrogen and carbon monoxide which comprises passing into contact with a fixed bed of an iron synthesis catalyst a reactor feed containing hydrogen and carbon monoxide in a mol ratio of about 15:1 to about 30:1 and comprising one part by volume of fresh feed consisting essentially of hydrogen and carbon monoxide in a mol ratio of about 2.5:1 to about 4:1 and about 8 to about 15 parts by volume of reaction vapors as described below, said contact of said reactor feed with said fixed bed of said catalyst being carried out at hydrocarbon synthesis temperature, superatmospheric pressure and under adiabatic conditions effective to convert at least 98 per cent of the carbon monoxide contacting said catalyst, cooling resulting reaction product to form a condensed fraction and reaction vapors, and recycling at least a portion of said reaction vapors for combination with said fresh feed to form said reactor feed.

CHARLES W. MONTGOMERY.
WILLIAM A. HORNE.

REFERENCES CITED

The following references are of record in the file of this patent:

UNITED STATES PATENTS

| Number | Name | Date |
|---|---|---|
| 943,627 | Elworthy | Dec. 14, 1909 |
| 1,643,663 | Klatte | Sept. 27, 1927 |
| 1,820,417 | Williams | Aug. 25, 1931 |
| 1,999,388 | Bader et al. | Apr. 30, 1935 |
| 2,074,311 | Moore | Mar. 16, 1937 |
| 2,251,554 | Sabel | Aug. 5, 1941 |
| 2,271,259 | Herbert | Jan. 27, 1942 |
| 2,461,570 | Roberts | Feb. 15, 1949 |
| 2,481,089 | Dickinson | Sept. 6, 1949 |

FOREIGN PATENTS

| Number | Country | Date |
|---|---|---|
| 503,622 | Great Britain | Apr. 12, 1939 |
| 616,499 | Great Britain | Jan. 21, 1949 |

OTHER REFERENCES

Weil et al., Synthetic Petroleum from the Synthene Process (pages 47 and 88).